United States Patent [19]

Uhlig

[11] 3,843,005
[45] Oct. 22, 1974

[54] BLOWN PLASTIC CONTAINER
[75] Inventor: Albert R. Uhlig, Toledo, Ohio
[73] Assignee: Owens-Illinois, Inc., Toledo, Ohio
[22] Filed: Feb. 11, 1972
[21] Appl. No.: 225,449

[52] U.S. Cl. .................... 215/1 C, 220/70, 264/89
[51] Int. Cl. ........ B65d 1/02, B65d 1/40, B65d 1/42
[58] Field of Search ............. 215/1 C, 12 R; 220/68, 220/70

[56] References Cited
UNITED STATES PATENTS

| | | | |
|---|---|---|---|
| 1,461,729 | 7/1923 | Foster et al. | 220/70 |
| 2,541,081 | 2/1951 | Lyon | 220/70 |
| 2,837,245 | 6/1958 | Grebowiec | 215/1 C |
| 3,059,810 | 10/1962 | Edwards | 229/1.5 B |
| 3,511,401 | 5/1970 | Lachner | 215/1 C |
| 3,693,828 | 9/1972 | Weussel et al. | 220/70 |

FOREIGN PATENTS OR APPLICATIONS

| | | | |
|---|---|---|---|
| 1,175,048 | 12/1969 | Great Britain | 215/1 C |
| 650,064 | 12/1962 | Italy | 215/1 C |
| 865,062 | 4/1961 | Great Britain | 220/70 |

Primary Examiner—William I. Price
Assistant Examiner—Stephen Marcus
Attorney, Agent, or Firm—Philip M. Rice; E. J. Holler

[57] ABSTRACT

This invention relates to a blown plastic container having an arcuate pressure bottom configuration, preferably provided with integrally formed multiple thickness support walls or "skirts" surrounding the bottom.

5 Claims, 33 Drawing Figures

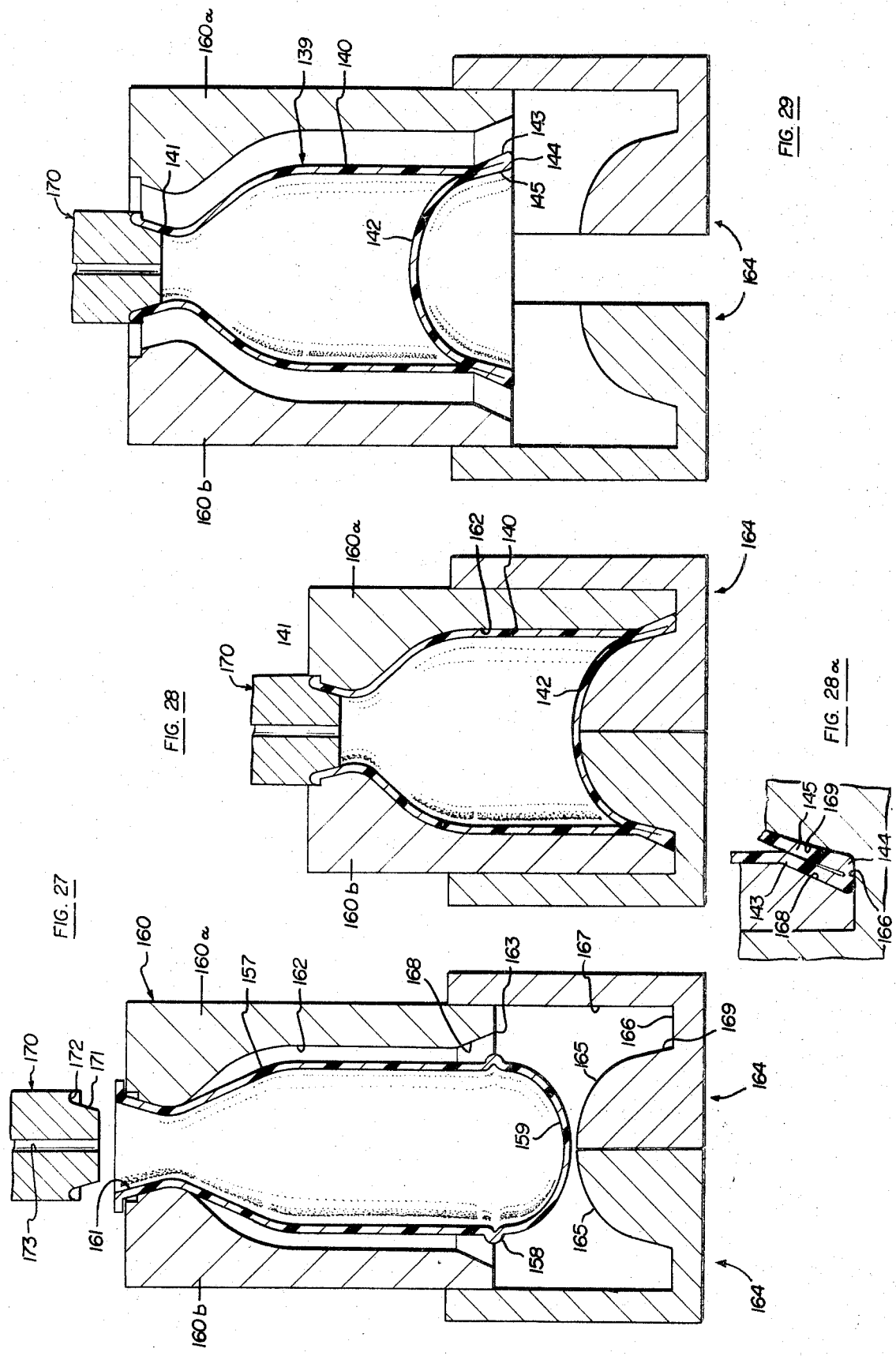

BLOWN PLASTIC CONTAINER

The invention also contemplates a method of making such containers by blowing the container in a blow mold having telescopically movable portions for physically contacting and deforming a blowable parison or preform positioned in the blow mold. The parison contact and deformation aids in forming the bottom and/or the surrounding support walls, while providing a favorable blow-up ratio during the blowing operation. Further, the method can be carried out under conditions causing multi-axial orientation in the final container.

RELATED APPLICATIONS

This application is related to the previously filed U.S. Pat. application Ser. No. 103,624, filed Jan. 4, 1971 in the name of Albert R. Uhlig, entitled "Method and Apparatus for Blow Molding," now U.S. Pat. No. 3,767,747 and assigned to the Assignee of the present invention.

BACKGROUND OF THE INVENTION

In the development of containers for the retention of liquid under pressure, for example carbonated beverages, beer and the like, it is desirable to provide the container with a "pressure bottom" configuration. Such bottoms are generally convex in configuration, although "domed" or concave configurations also are utilized. These bottom configurations generally avoid the sharp contour transition portions located at the "heels" of a conventional flat-bottom beverage container, and, as a result, enhanced bottom strength in the container is obtained.

This strength advantage is obtained in several ways. First, the design itself is simply better adapted to serve as a pressure vessel. Secondly, it is not necessary to move the plastic material, during blowing, into the sharp bottom areas or "heels" of the container, with the inevitable thinning of the plastic material at the heels. Additionally, better wall distribution generally is obtained throughout the entire container, not only at the bottom.

Containers having arcuate pressure bottom configurations suffer from one prime disadvantage, i.e., the convex bottom simply will not allow the container to stand upright during filling, shipping, display or use. This problem has been solved in the past by utilizing separately formed skirts or angular support walls which are adhered to the bottom to provide a support base. The cost of assembly, the utilization of disparate container and base materials, and the necessity of adhesive application all have caused difficulties in the utilization of this type of container.

BRIEF DESCRIPTION OF THE PRESENT INVENTION

The present invention now provides a container, such as a beverage bottle or the like, for retaining fluid contents under pressure and having a pressure bottom support configuration including an arcuate bottom wall of either convex or concave configuration. The bottom wall is preferably provided with an integrally formed, multiple thickness support structure or "skirt" located at the juncture of the container side walls and the container bottom wall. Since the preferred bottom wall pressure configuration is circular, the support walls generally are annular in configuration and are conical to project downwardly and outwardly from the region of bottom and side wall juncture to provide an enlarged support for the container.

Thus, the support preferably consists of a pair of conical skirts formed integrally, respectively, with the side wall and the bottom wall and joined integrally to one another at their extremities. The skirts are adhered to one another, preferably by heat sealing, to provide the multi-thickness bottle support structure.

The method of the present invention includes the formation of the arcuate pressure bottom configuration by enclosing the parison or preform from which the bottle is to be made interiorly of a blow mold which has telescopically movable parts, one of these parts having a surface defining the bottle bottom wall. During the blow molding operation, the one blow mold part is moved in contact with the preform before, during or after blowing to define the final shape of the pressure bottom.

In a preferred embodiment of the method of the present invention, this same movement of the bottom-defining portion of the blow mold also aids in forming the multithickness support wall. More specifically, the bottom wall-defining movement of the blow mold surface also pinches together the support wall-defining portions of the container and heat seals them together.

OBJECTS

It is, therefore, an important object of the present invention to provide a blown plastic container capable of retaining fluid contents under pressure and including an arcuate pressure bottom wall.

Another important object of this invention is the provision of a blown plastic container for containing the liquid under pressure and including an arcuate pressure bottom wall surrounded by a multiple thickness support wall for the container.

A further important object is the provision of a method of making a blown plastic container having pressure retention capability and wherein an arcuate bottom pressure wall is formed during blowing by telescopically moving a bottom-defining surface of the blow mold relative to the remainder of the blow mold.

It is yet another, and no less important, object of the present invention to provide a method of making a blown plastic container in a blow mold having relatively movable sections and moving one of the sections into contact with a blowable shape enclosed in the blow mold to deform the blowable shape from its original configuration and then blowing the blowable shape to its final article-defining configuration.

ON THE DRAWINGS

Figure 1:
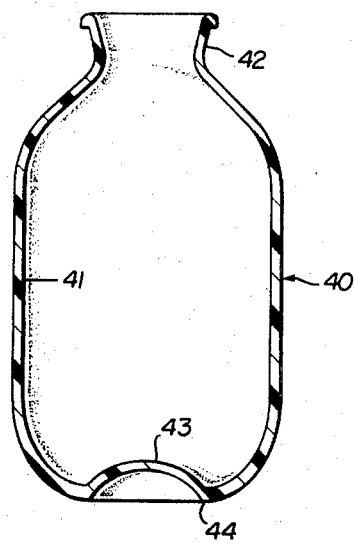
FIG. 1 is a vertical sectional view of a bottle of the present invention made by the method of the present invention.
Figure 2:
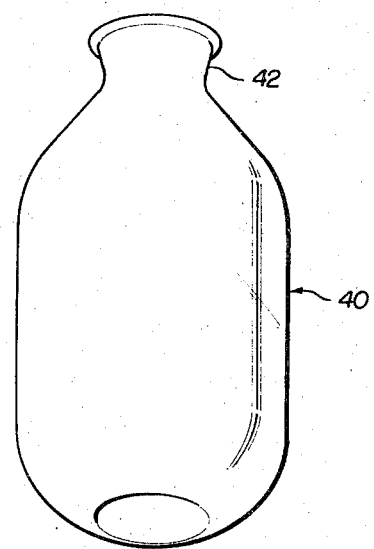
FIG. 2 is an exterior perspective view of the bottle of FIG. 1.
Figure 3:
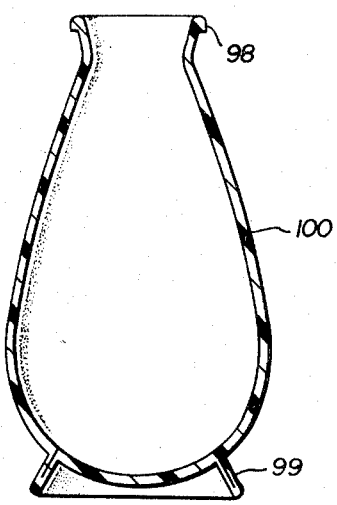
FIGS. 3 and 4 are views similar to FIGS. 1 and 2 of a different form of bottle of the present invention.
Figure 4:
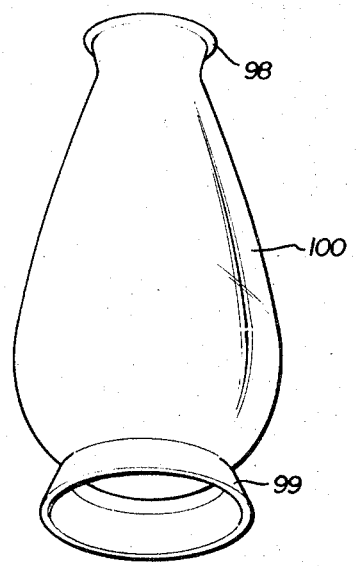
Figure 5:
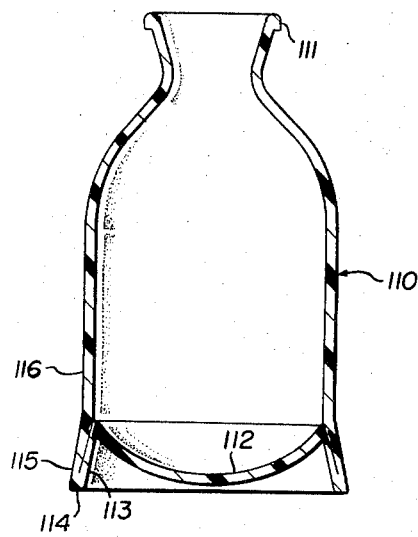
FIGS. 5 and 6 are views similar to FIGS. 1 and 2 of an additional form of bottle of the present invention.
Figure 6:
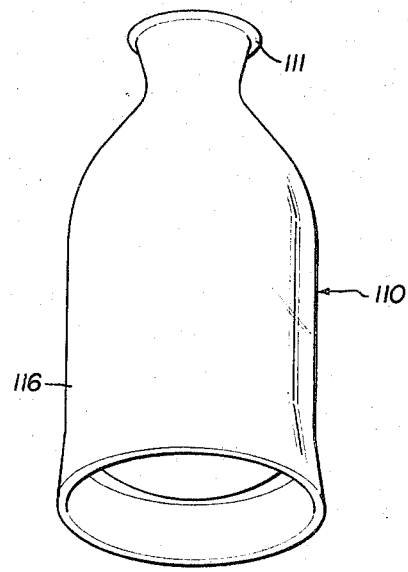
Figure 7:
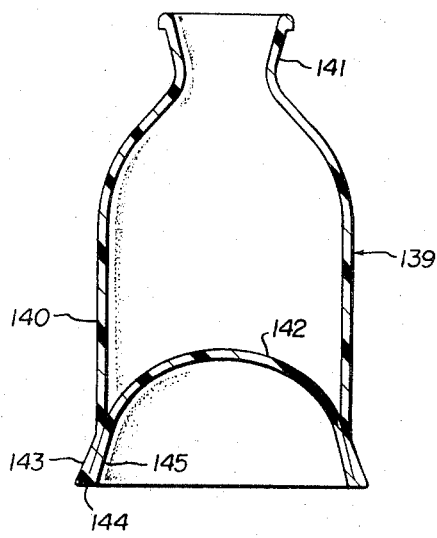
FIGS. 7 and 8 are views similar to FIGS. 1 and 2 of yet another bottle of the present invention.
Figure 8:
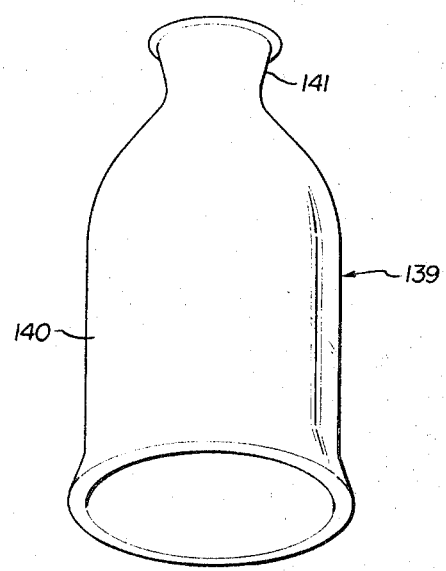
Figure 9:
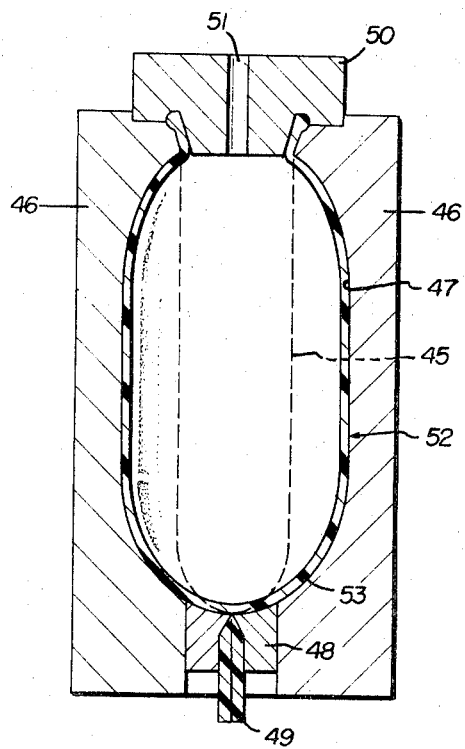
FIGS. 9 and 10 are similar schematic views illustrating the method of the present invention as applied to the manufacture of the bottle of FIGS. 1 and 2.
Figure 10:
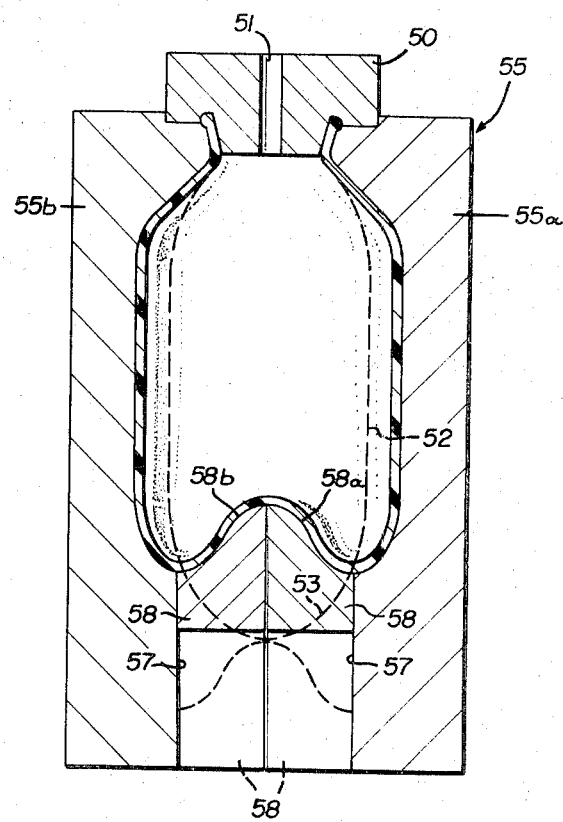
Figure 23:
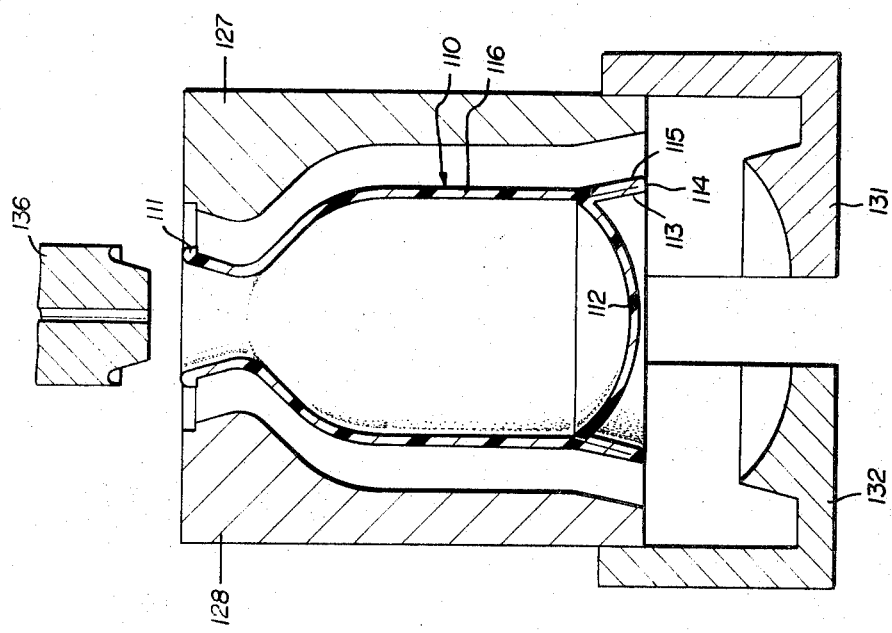
Figure 22:
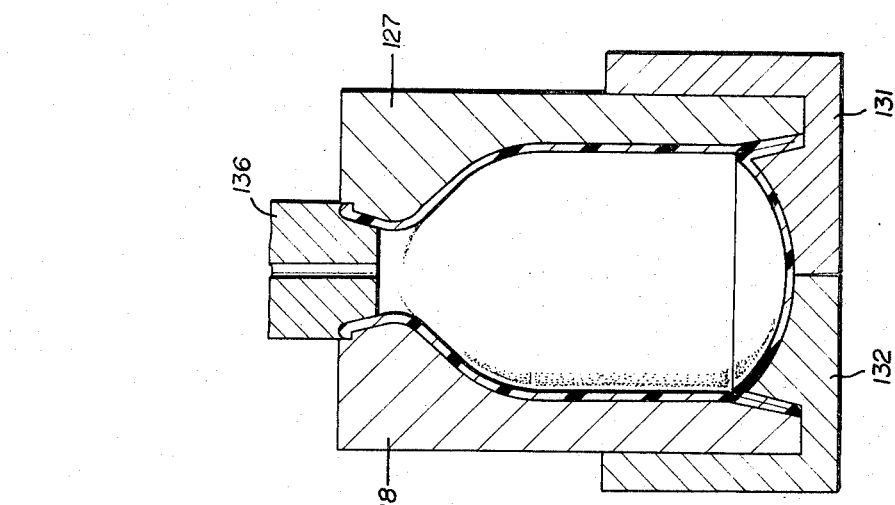
Figure 21:
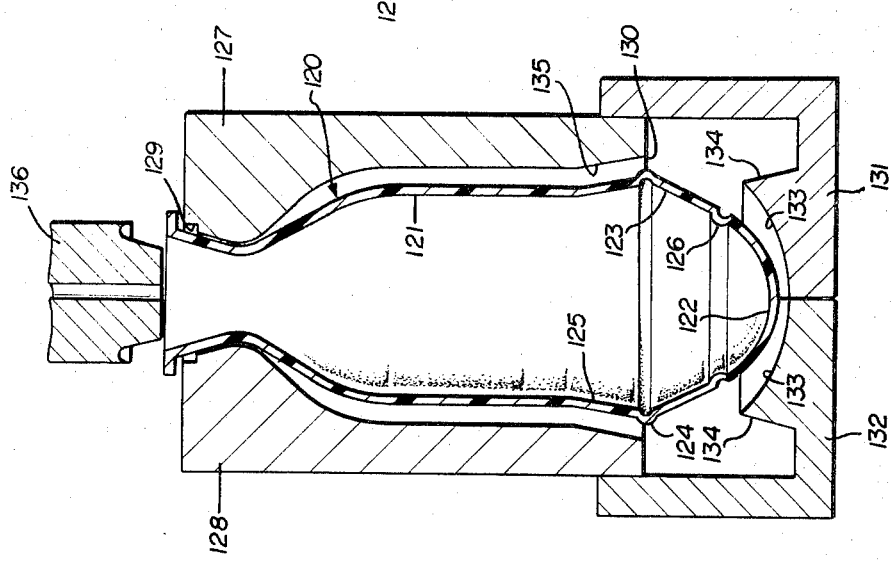
Figure 26:
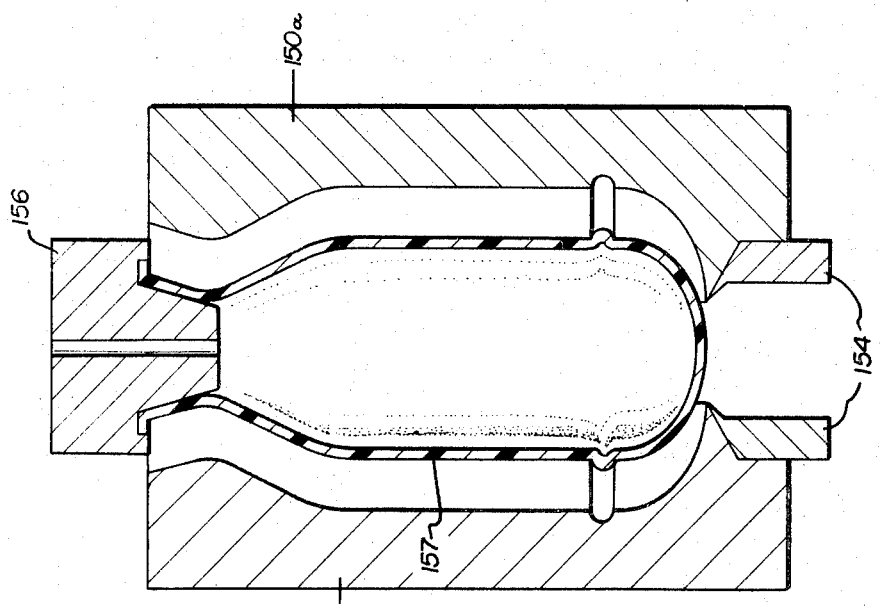
Figure 32:
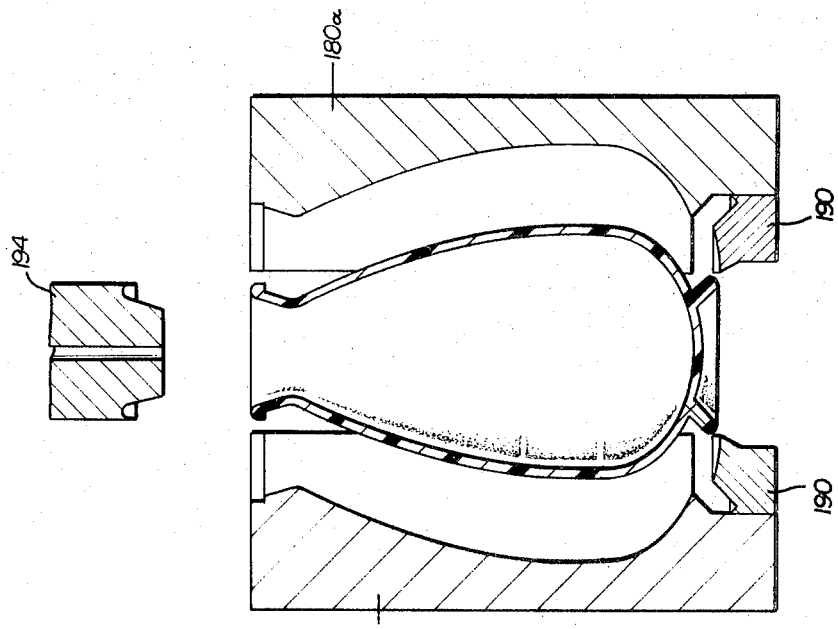
Figure 31:
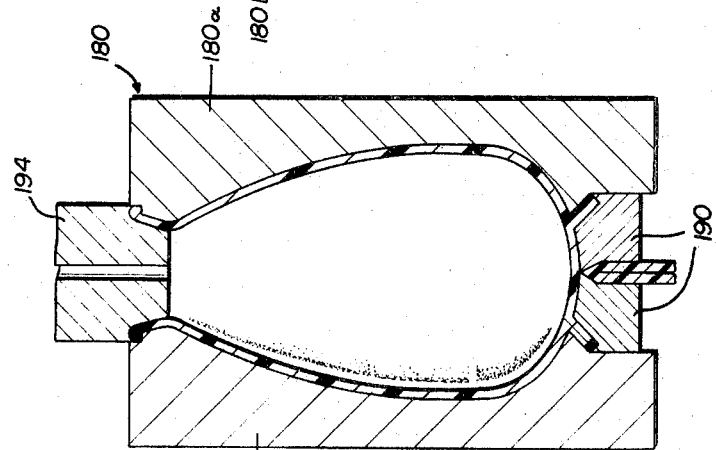
Figure 30:
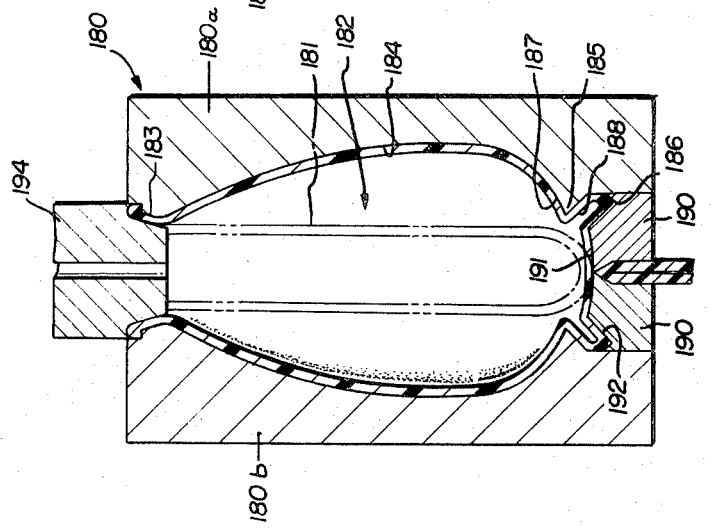

FIGS. 11 through 14 are views similar to FIGS. 9 and 10 showing a different method of the present invention of manufacturing the bottle of FIGS. 1 and 2;

FIGS. 15 through 20 schematically represent the method steps carried out by the present invention and the manufacture of the bottle of FIGS. 3 and 4;

FIGS. 21-23, inclusive, illustrate schematically the method steps carried out in the manufacture of the bottle of FIGS. 5 and 6;

FIGS. 24-29 illustrate schematically the steps carried out in the manufacture of the bottle of FIGS. 7 and 8; and FIGS. 30-32, inclusive, schematically illustrate the method steps carried out in the manufacture of a modified bottle similar to that illustrated in FIGS. 3 and 4.

AS SHOWN ON THE DRAWINGS

In FIGS. 1 and 2, reference numeral 40 refers generally to a bottle of the present invention made in accordance with the method of the present invention. The bottle 40 is generally cylindrical in configuration and, like the other bottles of the present invention, is integrally formed in one piece. More specifically, the bottle 40 includes an annular side wall 41 merging into and surmounted by an annular finish 42. The finish 42, as specifically illustrated, is adapted to receive a crimped beverage cap of the conventional type, but the finish 42 may provide full or partial helical threads, or it may receive a snap-type cap, or may be modified as desired.

The side wall 41 merges into a lower, arcuate bottom wall 43 which is concave in shape to lie wholly above the lower corner or "heel" 44 of the bottle. The arcuate bottom wall 43 is a "pressure bottom" in that its partial spherical configuration resists pressure confined interiorly of the bottle.

The bottle of FIGS. 1 and 2 is manufactured as illustrated in FIGS. 9 and 10 of the drawings. As shown in FIG. 9, a conventional, freely extruded, tubular parison 45 is issued from an upper, downwardly opening annular extrusion orifice (not shown). This parison 45 is enclosed within a pair of preform mold sections 46 cooperatively defining an interior preform mold cavity 47 of a configuration which more closely approaches the shape of the final bottle 40 than does the tubular parison 45. The mold sections 46 pinch shut the tubular parison 45, specifically pinching segments 48 carried by each mold section 46 engage the tube and pinch it shut to form a "tail" 49 interposed between the pinch segments 48.

A blow head 50 is inserted into the open upper end of the parison 45, this blow head fitting snugly into the upper opening defined by the closed mold sections 46 and engaging the tube free open upper end to hold it in place. Air under pressure is introduced through an axial opening 51 in the blow head 50 to inflate the tubular parison to the form of the preform cavity 47. It will be noted that the preform 52, after blowing, has a rounded, convex bottom, and this bottom is completed by actuation of the tail-pulling segments 48 downwardly, as is well known in the art.

The blown preform 52 now is transferred to a final blow mold 55 comprising openable and closeable sections 55a and 55b which cooperatively define an interior cavity 56 having the configuration of the finished article. It will be noted that each of these sections has a semi-cylindrical lower passage 57 within which is disposed a correspondingly shaped mold bottom section 58, the sections 58 being openable and closeable with the respective sections 55a, 55b, while being axially displaceable relative to the sections 55a and 55b. The bottom sections 58 have their upper portions contoured at 58a, 58b in a convex curve.

In the final blow molding operation carried out in the mold of FIG. 10, the preform is transferred to the mold by means of the blow pipe 50 and the mold sections 55a, 55b are closed thereon with the bottom sections 58 in their retracted positions shown in dotted outline in FIG. 10. After closure of the blow mold sections 55a, 55b on the preform, the bottom mold sections 58 are actuated upwardly from their lowered positions into contact with the convex bottom 55 of the preform, thus deforming the preform upwardly to the concave configuration of the final bottle, as illustrated in solid outline in FIG. 10.

The advantages residing in the utilization of the technique illustrated in FIGS. 9 and 10 of the drawings and the manufacture of the final bottle 40 of FIGS. 1 and 2 will be readily appreciated. Because of the configuration of the bottle, the attempted blowing of a cylindrical parison directly into the final bottle shape necessitates the greatest inflation of the parison in the exact "heel" section of the bottle, with resultant bottom weakness.

By utilizing the telescopic bottom mold sections 58 in the blow mold sections 55a, 55b, it is possible to inflate the tubular parison into the initial, gently curved convex bottom 53, and then mechanically deflect this bottom upwardly for blowing into its concave configuration as illustrated in FIG. 10. As a result a favorable blow-up ratio is maintained, the "heel" portion of the bottle is of enhanced strength, and the combination of physical deformation of the preform and blowing to final configuration results in a bottle of substantially constant wall thickness. The initial contact of the bottom mold sections 58 with the blown preform insures the maintenance of substantially the preform wall thickness throughout the bottom and heel portions of the finally blown bottle.

Of course, by the use of the preform blowing and subsequent final blowing as carried out in the preform mold 46 and the final blow mold 55 makes possible the final blowing at orientation temperature, as specifically set forth and claimed in the above-identified U.S. Pat. application Ser. No. 103,624. As a result, all of the advantages set forth therein can also be obtained in the practice of the present invention.

Figure 11:
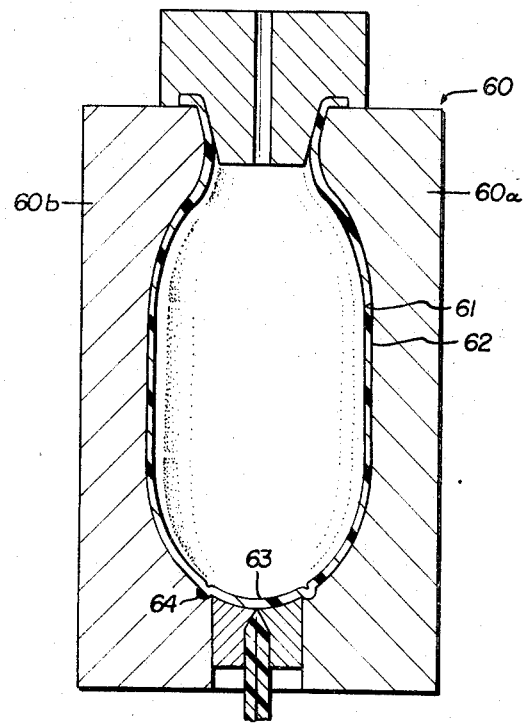

Essentially the same type of bottom is made in accordance with the disclosure of the modified method illustrated in FIGS. 11 through 14 of the drawings. In FIG. 11, it will be seen that the initial parison 59 is a freely extruded dependent tube which is enclosed within preform mold 60 comprising mold sections 60a, 60b. The preform mold is substantially the same as that described in connection with FIG. 9, with the exception of an annular groove 61 cut into the cavity jointly defined by the preform mold half 60a, 60b. This groove 61 encircles the cavity slightly above that portion of the cavity which is to define the convex preform bottom. Following inflation of the tube, the preform 62 results.

This preform has a convex bottom 63 which is encircled, slightly above the bottom thereof, by a rib 64 which has been formed in the groove 61. This rib forms, in essence, adjacent and reversely tapered conical surfaces.

Figure 12:
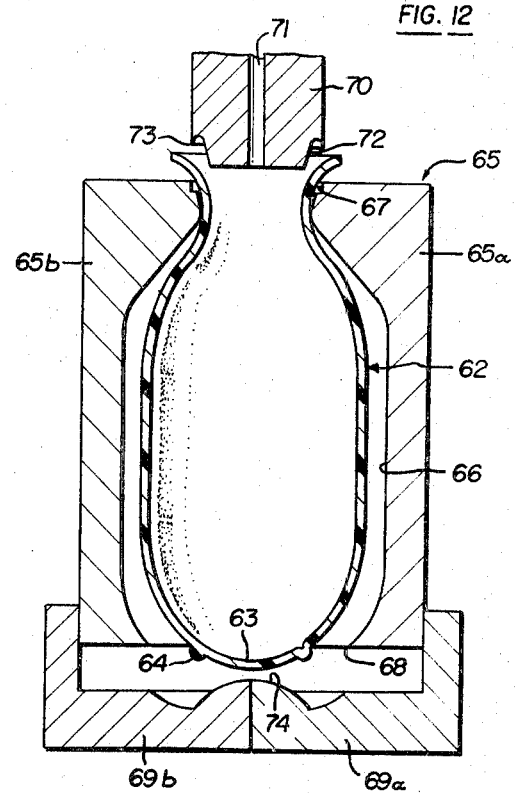

Next, the preform tail is removed, as above explained in connection with FIG. 9 or by other suitable means, and the preform is transferred to a final blow mold 65 illustrated in FIG. 12. The final blow mold 65 comprises a pair of closeable and openable blow mold sections 65a and 65b which cooperatively define an open ended interior mold cavity 66, the upper extremity of this mold cavity having a finish-defining recess 67 therein, and the lower end of the blow mold being open, as at 68.

Telescoped over the blow mold sections 65a and 65b are separate, relatively movable mold bottom plates 69a and 69b, respectively, which are movable laterally for opening and closing with the blow mold sections 65a, 65b, respectively. The bottom plates 69a are also telescopically movable axially relative to the blow mold sections 65a, 65b when the blow mold sections 65a, 65b are forced downwardly under the thrust of the upper blow pipe 70.

This blow pipe 70 has an axial air opening 71 a lower conical portion 72 and a peripheral shearing edge 73 located above the conical surface 72. Upon insertion of the blow pipe into the upper opening of the closed blow mold sections 65a, 65b, the blow pipe surface 72 and the shearing edge 73 reform the upper extremity of the preform 62 to the final finish configuration of the container, all as described in the above-identified U.S. Pat. application Ser. No. 103,624.

Figure 13:
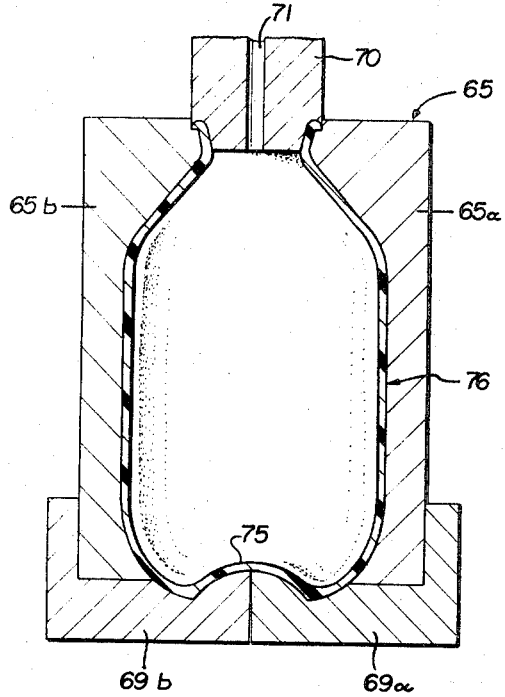
Figure 14:
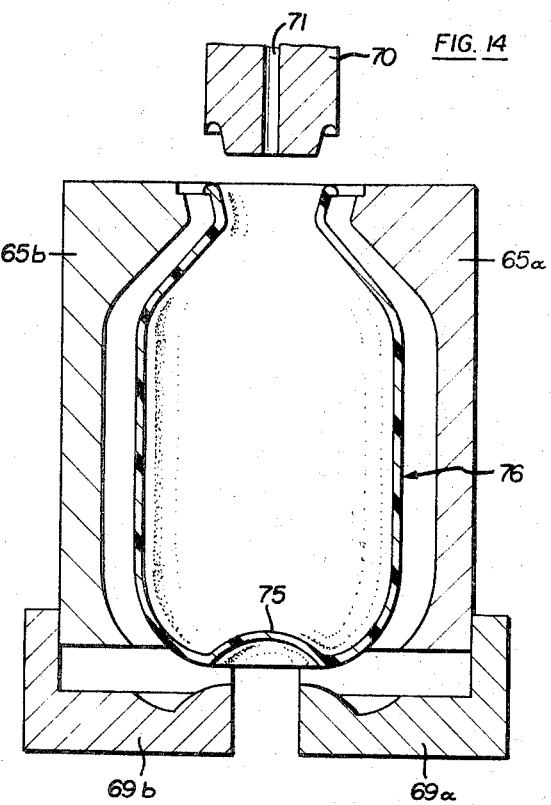

Further, the downward thrust of the blow pipe 70 bottoms the mold sections 65a, 65b on the lower or bottom plate sections 69a, 69b. The raised convex bottom-defining section 74 cooperatively defined by the bottom plate 69a, 69b contacts the lower extremity of the preform and deflects the preform upwardly into the arcuate, concave bottom 75 of the finished bottle 76 as illustrated in FIGS. 13 and 14.

The location of the ribs 64 relative to the initial convex bottom 63 is such that this rib 64 of double thickness encircles the bottom 75 of the finished container 76 to provide a support surface for the final bottle.

Once again, the preform can be quite uniformly inflated without any thinning at the heel portion, the double thickness rib 64 circumscribing the arcuate, concave bottom 75 is essentially formed during the preform blowing, and the bottom is reinforced by the multi-thickness support wall provided by the rib 64 at the juncture of the side walls and bottom wall of the final container 76.

Turning now to the bottle of FIGS. 3 and 4 of the drawings, the method of making this bottle is illustrated in FIGS. 15 through 20, inclusive.

Figure 15:
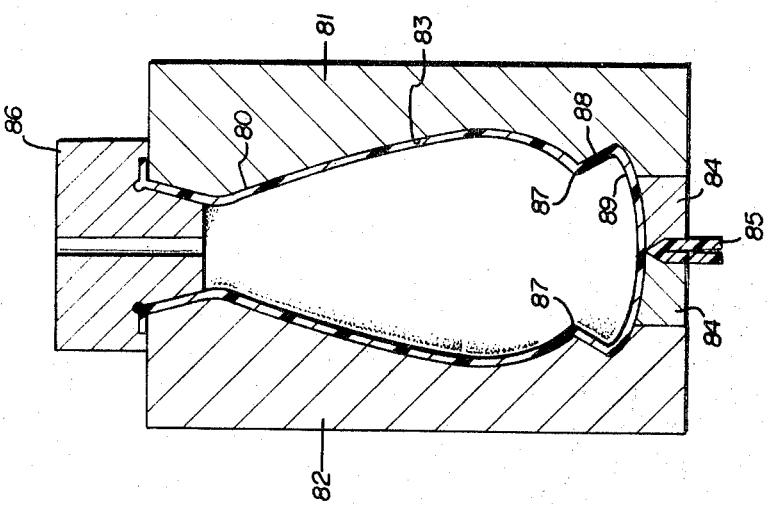
Figure 20:
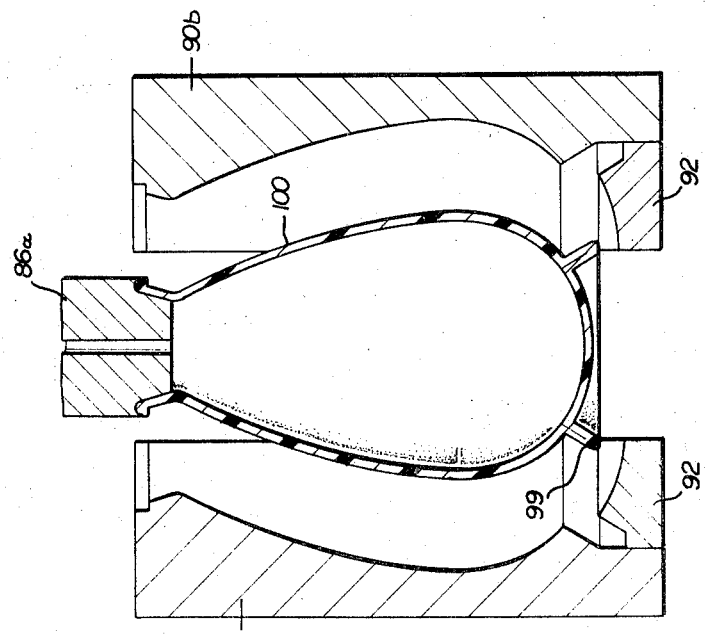

In FIG. 15, the initial formation of a preform 80 is illustrated, this preform being made in separable preform blow mold sections 81, 82 which cooperatively define a mold cavity 83 which is open at its upper and lower extremities. The lower extremities of the mold cavity 83 are closed by separate bottom plates 84 which are carried by the blow mold sections 81, 82 for transverse movement therewith, the plates 84 pinching the initial parison therebetween to form the "tail" 85 as the tube is pinched shut.

Figure 16:
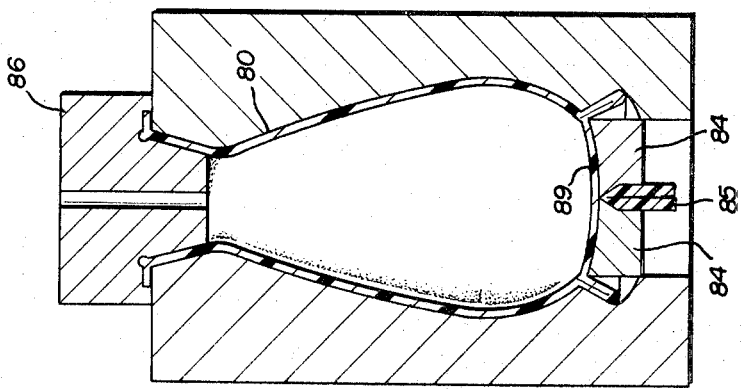

The bottom plates 84 are also displaceable axially relative to the blow mold or preform blow mold sections 81, 82 as will be appreciated by comparison of FIGS. 15 and 16. This displacement of the bottom plates 84 can be carried out in any one of several ways. As illustrated, the downward thrust of the blow pipe 86 after initial inflation of the initial parison interiorly of the mold sections 81, 82 can be utilized to telescopically force the preform blow mold sections 81, 82 downwardly over the fixed bottom plate 84.

The blow pipe 86 is essentially the same as that illustrated and described in connection with earlier embodiments of the invention. From inspection of FIG. 15, it will be seen that the preform 80, as initially formed, reduces in cross-sectional configuration toward the bottom thereof to the point of juncture of the bottom of the finished container and the side wall of the finished container, this narrowing of the preform being indicated by reference numeral 87. Beneath the point 87, the preform flares outwardly in a conical configuration, as at 88, and this flared conical configuration merges into the reversely tapered concave bottom 89 of the preform 80. Dimensionally, the transverse extent of the bottom plates 84 is somewhat less than the transverse distance between the points 87, the difference being less than twice the wall thickness of the preform 80.

Upon displacement of the preform blow molds 81, 82 relative to the bottom plates 84, the bottom 89 of the preform is displaced relatively upwardly toward the points 87. The extent of displacement of the mold sections 81, 82 relative to the bottom plates 84, is such that the bottom wall 89 of the preform becomes aligned with the points 87 so as to define a smooth, convex bottom for the parison 80. Contact between the still hot plasticized material 89 of the bottom and this same material at the points 87 under pressure exerted by relative movement of the mold sections and the bottom plates will heat seal the points 87 to the bottom 89 in the immediate vicinity of the outer corners of the bottom plates 84 and completely around the points 87.

In effect, relative telescopic movement of the mold sections 81, 82 and the bottom plates 84 has pinched shut the reversely tapered conical portions 88 of the preform side wall and the bottom wall 89 at a point above the bottom extremity of the preform, thus forming double thickness generally conical portions 96 on the preform. The reversely tapered portions 88 of the preform mold sections 81, 82 form recesses into which the pinched portions 96 of the preform are displaced outwardly by movement of the bottom plates 84.

Figure 17:
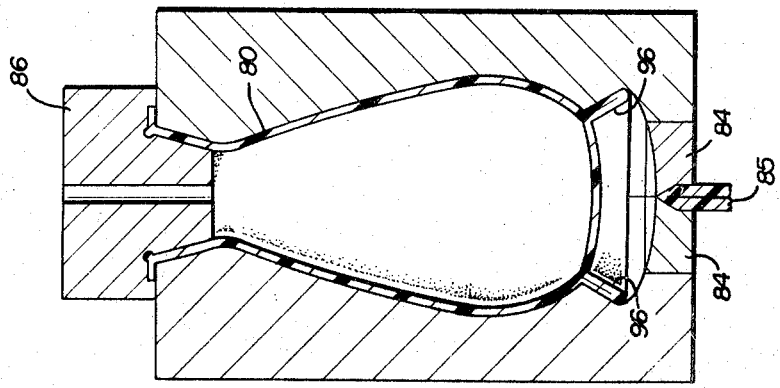

To complete the preform, as illustrated in FIG. 17 of the drawings, the thrust of the blow pipe 86 is relieved, and the preform blow mold sections 81, 82 and the preform blow mold bottom plates 84 are moved relatively to return to their initial positions of FIG. 15. This return of the preform blow mold parts is illustrated in FIG. 17. During such elevation of the blow molds 81, 82 relative to the portions 84, the tail 85 of the preform is removed.

Next, the finished preform 80 is transferred to a final blow mold indicated generally at 90 and consisting of two blow mold halves 90a, 90b having an internal cavity 91 which has the shape and size of the finished bottle. Each blow mold half 90a carries a bottom plate 92 movable transversely for opening and closing movement with its respective mold half 90a, 90b, and axially displaceable relative to its respective mold half. Each such bottom plate 92 is provided with an upper arcuate recess 93, the recesses cooperatively defining the contour of the bottom of the finished bottle. Further, each mold bottom plate 92 has an exterior semi-conical side surface 94 cooperable with tapered side surfaces 95 of the blow mold sections 90*a*, 90*b* underlying the blow mold recess 91 and communicating therewith. The tapered blow mold half surfaces 95 are adapted to receive therebetween the pinched portions 96 of the preform 80, which had been previously formed as above described.

Figure 18:
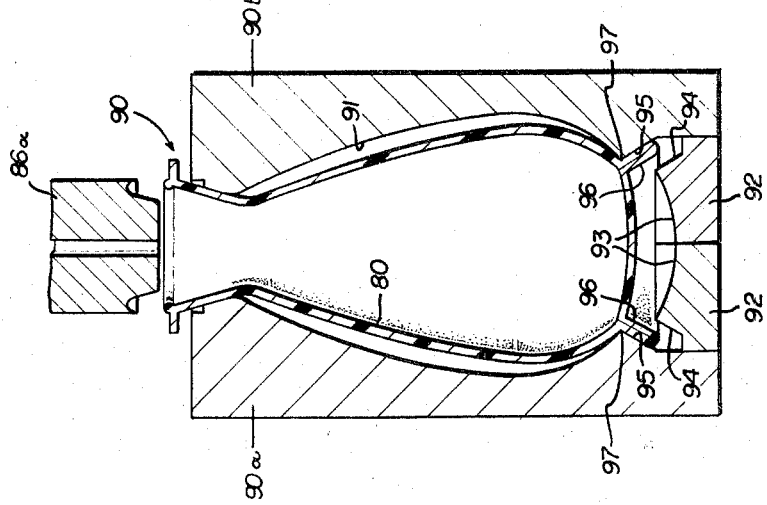

The contour and size of the blow mold cavity 91 is such that the preform 80, when disposed interiorly of the cavity 91 as illustrated in FIG. 18 of the drawings rests on the lower annular lip 97 of the cavity 91 located at the juncture of the cavity 91 with the tapered surfaces 95.

Figure 19:
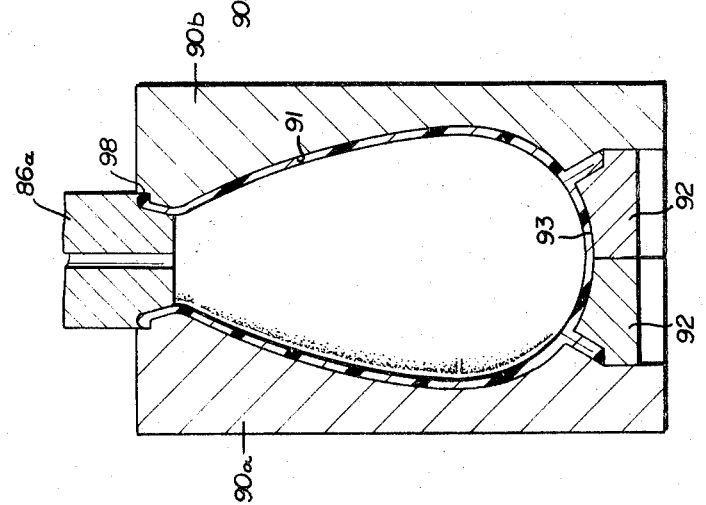

Next, a blow pipe 86A similar to the blow pipe 70 earlier described in connection with the embodiment of the invention shown in FIG. 12 of the drawings, is inserted into the open upper end of the preform 80, and the blow pipe thrusts the blow mold sections 90*a*, 90*b* downwardly relative to the bottom plates 92. This relative motion between the mold sections 90*a*, 90*b* and the bottom plates 92 contacts the upper arcuate surfaces 93 of the plates 92 with the bottom of the preform, and the tapered surfaces 94 on the plates 92 coact with the tapered surfaces 95 on the blow mold sections to urge together under pressure the previously pinched portions 96 of the preform. This operation is illustrated in FIG. 19 of the drawings.

Next, air under pressure is introduced through the blow pipe 86A to inflate the preform to the exact configuration of the final bottle as determined by the mold cavity 91 and the upper arcuate surfaces 93 of the bottom plates 92. Of course, the blow pipe also reforms and finishes the finish 98 of the bottle at the same time as above described and also as described in greater detail in my above-identified pending application.

The mechanical deformation and pressuring of the previously pinched portions 96 results in the formation of a double thickness conical bottom support wall 99 for the finished container 100, the two thicknesses of plastic forming the support wall 99 being heat sealed together throughout substantially their entire length. In essence, this support wall is defined by the formation of the two outwardly flaring, generally conical, peripheral skirts during the pinching together of portions of the preform as above described in connection with FIGS. 16 and 17 followed by the final pressing carried out by the method step illustrated in FIG 19. One of these skirts is formed integrally with the side wall of the container and the other of these skirts is formed integrally with the bottom wall of the container, and these skirts are joined integrally to one another at their bottom extremities, since the plastic is merely folded back upon itself during formation of the skirts.

It has been found that heat sealing at relatively low temperatures, e.g. 220° F or greater, is possible for most thermoplastic resins utilized in pressure containers, such as polyvinyl chloride and polyethylene. So long as the operation of FIG. 19 is carried out while the temperature is above its minimum heat sealing temperature, the formation of the multiple thickness support wall 99 will be possible.

From the description already given, the structure of the bottle 100 as illustrated in FIGS. 3 and 4 of the drawings will be evident.

Turning now to the bottle illustrated in FIGS. 5 and 6 of the drawings, it will be seen that this bottle is of somewhat different configuration than those earlier described. More particularly, this bottle comprises a main body portion 110 of generally cylindrical configuration and having an upper finish indicated generally at 111. Again, the finish configuration can be as desired to receive an appropriate cap.

The bottom of the bottle is convex, as illustrated at 112, and the bottom 112 has an integrally formed, generally dependent, but slightly outwardly flaring conical support surface 113 integrally joined, as at 114, to a similarly tapered and conical support wall 115 formed integrally with the side walls 116 of the container. The exterior surface of the interior wall 113 is heat sealed or otherwise adhered to the inner surface of the outer wall 115, thereby providing a multiple thickness bottom support for the bottle and permitting utilization of the convex, pressure resistant configuration of the bottle bottom 112.

The method of formation of the bottle of FIGS. 5 and 6 is illustrated in FIGS. 21-23, inclusive, of the drawings.

In FIG. 21, a preform 120 has been previously formed by blowing a parison to shape. This preform generally is formed in the same way as the preform is blown in FIG. 9 of the drawings previously described. The preform 120 has its side walls 121 joined to its convex bottom wall 122 by a hinged joining portion 123. This hinged joining portion 123 is joined to the side walls 121 by means of a peripheral external bead 124 immediately underlying conically outwardly flaring side wall portions 125 which will become the outer support wall 115 in the final container. The hinged wall 123 will become the inner support wall 113 in the final container, and this hinged portion 123 is joined to the bottom 122 by an inwardly projecting bead 126.

The preform 120 is suspended interiorly of separable blow mold halves 127, 128 having an upper finish-defining opening 129 and a lower opening 130 generally aligned laterally with the upper outwardly directed bead 124. Separate bottom plates 131, 132 are provided for each mold half 127, 128, respectively, these bottom plates 131, 132 being laterally separable with the mold halves, yet independently axially displaceable relative thereto. Each mold bottom plate 131, 132 has a concave upper surface 133 for contacting the bottom 122 of the preform 120.

Outwardly and downwardly flaring semi-conical surfaces 134 are provided on each mold bottom plate 131, 132 for contacting the fold portion 123 of the preform 120 and generally parallel, downwardly and outwardly flaring semi-conical portions 135 are provided in each blow mold half 127, 128 for contacting the portions 125 of the preform 120.

Initially, a blow tube 136 is brought down into position to close the open upper end 129 of the blow mold halves 127, 128 and to clamp the upper end of the preform 120 in position relative to the mold halves 127, 128. At the same time, this blow pipe 136 reforms the finish of the container in the manner described previously in this application and described in detail in my above-identified earlier pending patent application.

Continued downward displacement of the blow pipe 136 will telescope the blow mold sections 127, 128 interiorly of the bottom plate sections 131, 132, respectively until the relative positions illustrated in FIG. 22 are obtained. During such telescopic movement, the bottom 122 of the preform 120 is displaced vertically upwardly, the hinge 126 overlapping the edges of the bottom plate support surfaces 133, so that the bottom plate surfaces 134 contact the exterior of portion 123 of the preform. As the bottom plates 131, 132 move relatively upwardly, the portion 123 is contacted at its exterior surface by the surfaces 134 and the conical portions 125 of the preform are moved outwardly into contact with the mold half surfaces 135. At the same time, blow air is introduced through the blow nozzle 136, and the preform is inflated against the cavity of the blow mold halves 127, 128.

Thus, telescopic movement of the mold parts folds and then pinches together those portions of the preform located immediately above the bottom portion 122 of the preform at the same time that the bottom portion 122 of the preform is being elevated. As a result, the surfaces 134, 135 urge the preform portions 123 and 125 into surface abutment for heat sealing together to form the multiple thickness support wall surrounding and supporting the bottom 112 of the final container.

Turning now to that form of bottle illustrated in FIGS. 7 and 8 of the drawings, it will be seen that the bottle 139 includes side walls 140 surmounted by a finish 141 of any desired type. The side walls 140 flare outwardly to conical support walls 143 at their lower extremity which is joined integrally at 144 to an interior, domed, concave bottom wall 142. The domed bottom wall 142 is a semi-spherical in shape, so that the lower extremities 145 of the bottom wall 142 are generally axially conical in configuration, as will be hereinafter explained in detail, and the conical portions 145 of the bottom 142 and 143 of the side wall 140 are heat sealed together to provide a multiple thickness support wall for the bottom.

The method of manufacturing the bottle 139 of FIGS. 7 and 8 is illustrated in FIGS. 24 through 29.

Figure 24:
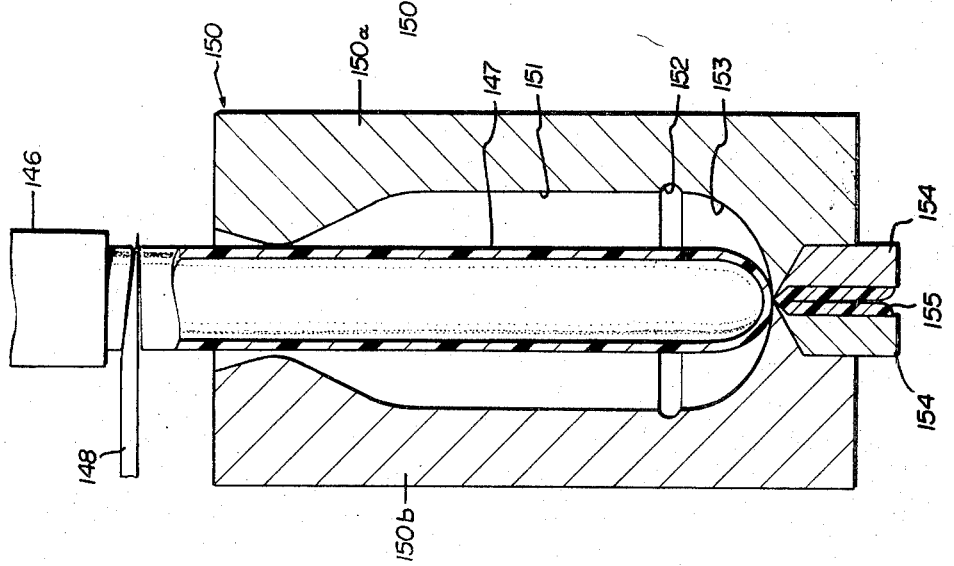

As illustrated in FIG. 24, the initial step in the manufacture of the bottle 140 of FIG. 7, involves the extrusion of a tubular initial parison 147 from an overhead, downwardly directed orifice block 146, the parison being cut from the extrudate issuing from the nozzle 146 by a knife 148 in a manner well known in the prior art.

Prior to severing by the knife 148, the preform blow mold 150 is moved into surrounding position with the parison 147, the blow mold halves 150a, and 150b being closed on the parison, also in a manner well known in the prior art. The parison mold halves 150a and 150b carry at their lower extremities a pair of pinching elements 154 which are openable and closeable with the blow mold sections, but relatively axially movable, as earlier described and as known in the prior art.

The blow mold halves 150a, 150b define an interior preform blow mold cavity 151 which is of a shape intermediate the shape of the initial tubular parison 147 and of the final bottle 140. This mold cavity 151 includes a peripheral recess or groove 152 located intermediate side wall-defining portions of the cavity 151 and the bottom-defining portion 153 of the cavity 151. It will be noted that the bottom wall-defining cavity 153 is convex, as contrasted with the concave shape of the final bottom wall 142 of the container 140. Upon closure of the blow molds, the pinching portions 154 thereof pinch shut the parison 147, the lower pinched portion or "tail" 155 of the parison thus being located completely outside the confines of the preform cavity 151.

Figure 25:
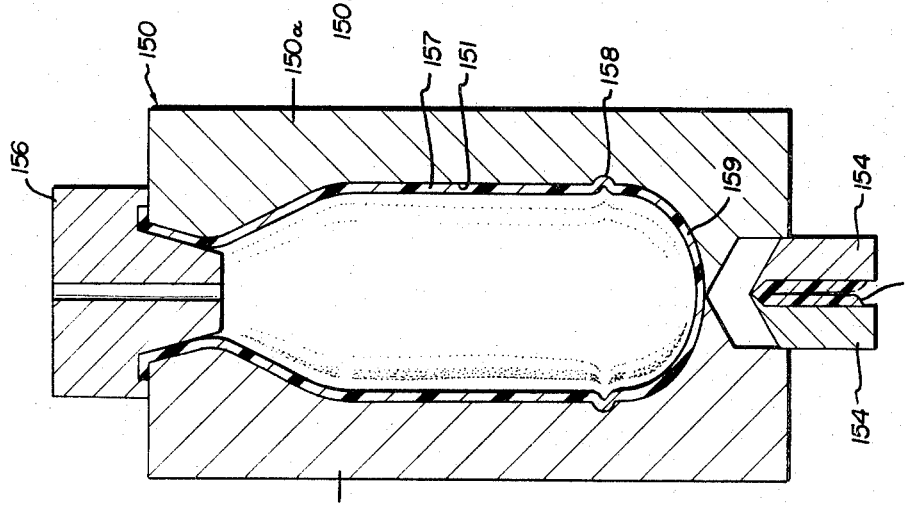

As illustrated in FIG. 25, the next step involves the insertion of a blow pipe 156 into the open, upper cut end of the parison 147 and the introduction of blow air through this blow pipe into the interior of the parison 147. The parison 147 thus is inflated into the blown preform 157 having a peripheral bead or rib 158 encircling the preform intermediate the side walls and the bottom 159 thereof. It will be noted that this rib 158 is of an axial and radial extent such that the rib actually is defined by a pair of oppositely tapering, conical rib walls.

Following the inflation of the parison 147 into the preform 157, the tail removal elements 154 are actuated downwardly to sever the tail 155 from the blown preform 157. Next, the preform blow mold sections 150a, 150b are opened and the preform, retained by the blow pipe 156, is removed for subsequent processing.

As illustrated in FIGS. 27 through 29, the preform 157 is transferred to a final blow mold 160 consisting of blow mold halves 160a, 160b which are openable and closeable transversely, the blow mold halves being illustrated in their closed position in FIG. 27 and in their open position in FIG. 29.

The blow mold halves 160a, 160b, when closed, define a cavity which generally conforms to the shape of the bottle 140 which is opened at its upper end 161 and which is opened at its lower end as at 163. The blow mold halves 160 terminate short of the overall length of the preform 157, the bottom open end 163 of the blow mold halves 160a, 160b being located immediately adjacent the location of the rib 158 of the preform 170 and above the bottom 159 of the preform. Each of the blow mold halves 160a, 160b carries a bottom plate indicated generally at 164, these bottom plates being movable transversely for opening and closing movement with the blow mold halves 160a, 160b. The bottom plates 164 also are movable vertically (axially of the preform 157) relative to the mold halves 160a, 160b. More specifically, these bottom plates 164 each have a spherical surface 165 located centrally of the completed blow mold 160 and conforming generally to the shape of the bottom 142 of the finished container and merging through a conical surface 169 into a bottom recess 166 adapted to receive the lower open end of the associated blow mold segment 160a, 160b. A cylindrical vertical guide surface 167 projects upwardly from the recess 166 on the exterior side thereof for guiding vertical movement of the bottom plates 164 relative to the blow mold sections 160a, 160b.

During the blowing operation, a blow nozzle 170 is inserted into the open upper end of the preform 157. This blow pipe 170 has a conical surface 171 insertable into the open end of the preform 157 and a finish-defining recess 172 which is cooperable with the upper end of the blow mold to define the final finish 144 of the bottle 140. The blow pipe has a passage 173 for the flow of air under pressure therethrough to inflate the preform to its final configuration.

As illustrated in FIG. 28, the thrust of the blow pipe 170 against the open upper end of the blow mold 160 telescopes the blow mold downwardly relative to the bottom plates 164 with the lower open end of the blow mold halves 160a, 160b entering the recesses 166. During such telescopic movement, the partial spherical surfaces 165 of the bottom plates 164 contact the bottom 159 of the preform 157 and deform the bottom 159 upwardly to the concave configuration of the final bottom wall 142. This upward movement of the preform bottom wall 159 actually hinges the bottom wall 159 around the peripheral rib 158 of the preform 157 which is located at the juncture of the blow mold halves 160a, 160b and the bottom plate 164. During the completion of the telescopic movement, the frustoconical wall section 168 recessed at the lower ends of the blow mold halves contact the exterior of the preform immediately above the rib 158, while the conical surfaces 169 immediately adjacent the juncture of the partial spherical surface 165 at the bottom of the recess 166 contacts the exterior surface of the preform bottom wall 159 immediately below the rib 158.

As illustrated in FIG. 28A, the surfaces 168, 169 are of slightly different slope and, when fully telescoped, the surfaces approach one another upwardly to pinch shut the bottom support wall portions 143, 145 earlier described in connection with FIGS. 7 and 8.

The material which originally constituted the peripheral rib 158 of the preform 157 constitutes the lower joining portion 144 at the extreme lower end of the container, this material simply being folded upon itself to form the integral juncture between the walls 143, 145. Since the surfaces 168, 169 force the material into extended surface contact and the material is still hot, the walls 143, 145 are heat sealed or heat welded together to form the multiple thickness bottom wall support for the container 140.

Finally, the blow mold sections 160a, 160b are opened as the blow pipe 170 is retracted upwardly, and the final bottle 140 is released as illustrated in FIG. 29.

It will be noted that in each method of manufacturing a bottle heretofore described in conjunction with the previously illustrated embodiments of the present invention, utilized a preform blowing step. The method may also be adapted to form a bottle without such an intermediate or preforming step. This method is illustrated in detail in FIGS. 30–32, inclusive. This form of bottle formed by the method of FIGS. 30–32 is illustrated in FIGS. 3 and 4, but the method can be adapted to other bottles as well.

In further detail, FIG. 30 illustrates the closure of a blow mold 180 on a tubular parison illustrated in dotted outline at 181 to pinch the tube shut and form a blowable shape therefrom.

More specifically, the blow mold 180 comprises a pair of blow mold halves or sections 180a, 180b which are laterally closeable onto the extruded parison 181. The blow mold cavity 182 defined by the blow mold 180 includes an upper finish-defining portion 183, and intermediate side wall defining portion 184 terminating in a lower, inwardly directed rib 185 overlying a lower cylindrical recess 186. The rib 185 has a partially spherical upper surface 187 which merges into the side wall-defining portion 184 of the associated blow mold half 180a, 180b and which partially defines the bottom of the finished container. The under surface of the rib, as illustrated at 188, is conical in configuration to define a portion of the bottom support wall 99 of the container illustrated in FIGS. 3 and 4.

Positioned in each of the semi-cylindrical recesses 186 of the mold halves 180a, 180b is a pair of tail pinching elements 190, these elements being transversely movable with the associated blow mold halves and being axially or vertically movable relative thereto as has been above described. The upper surface of each of the tail elements 190 is arcuate in contour to smoothly blend into the bottom-defining wall portion 187 of the associated blow mold cavity 182. The radially outer portion of each of the tail pulling element 190 underlies the rib 185 on the associated conical surface 188. The outer portion 192 of each tail pulling element 190 has a conical configuration which lies parallel to the surface 188 and in axially spaced relation thereto, when the tail elements 190 are positioned as illustrated in FIG. 30.

Also, as shown in FIG. 30, the parison 181 is inflated by means of a blow pipe 194 inserted into the open upper end of the parison and cooperating with the finish-defining portions of the blow mold sections 180a, 180b to define the finish of the bottle as has been heretofore described. Upon inflation of the pinched-shut parison, the parison is blown outwardly against the walls of the blow mold sections 180a, 180b, the parison extending outwardly into contact with the side wall-defining portions 184, the partial bottom defining portions 187, the conical portions 188, 192, and the short cylindrical length of the recess 186, all as illustrated in FIG. 30.

While the parison is still hot and after its inflation, the tail elements 190 are actuated relatively upwardly with respect to the blow mold sections 180a, 180b as will be seen from a comparison of FIGS. 30 and 31. Preferably, this motion is accomplished under the thrust of the blow tube 194. Such relative movement of the tail portions 190 and the blow mold sections will bring the portions of the blown preform contacting the bottom-defining surfaces 190 into registry with the surfaces 187 of the blow mold sections to define the smooth convex bottom of the final container. Such movement also will bring into abutment those portions of the blown parison contacting the conical surfaces 188, 192 and these surfaces will be heat welded into contact to define the multi-thickness bottom support wall underlying the bottom of the finished container.

Next, the blow molds are retained in their position of FIG. 30 until such time as the heat welding or heat sealing of the bottom-defining portions has been completed, then the tail sections 190 are moved relatively downwardly with respect to the blow mold sections 180a, 180b, thereby removing the tail from the finished container.

Next, the mold halves 180a, 180b are laterally separated and the blow pipe 194 is retracted upwardly to release the finished container.

I claim:

1. In a blown plastic container having a finish and integral side walls, the improvement of an integral pressure bottom support configuration including an arcuate bottom wall integral with said side walls, an outwardly flaring peripheral skirt integral with said bottom wall, and a second outwardly flaring peripheral skirt integral with said side wall and encompassing the skirt of said bottom wall, said skirts being joined integrally to one another at their bottom extremities to form a support edge for said container and skirts being integrally and continuously heat sealed to one another adjacent said support edge to define a multiple thickness support wall, said side walls, said bottom wall and both of said skirts having the same thermal history.

2. In a container as defined in claim 1, the further improvement wherein said bottom wall is convex and the bottom wall skirt is conical to surround the bottom wall and project therebelow, the bottom wall and skirt being joined integrally to one another at the outer periphery of the bottom wall, and the second skirt also is conical and is in surface contact with the outer surface of the bottom wall skirt throughout substantially the entire length of said bottom wall skirt.

3. In a container as defined in claim 1, the further improvement wherein said bottom wall is concave to lie wholly above both the skirts, and the skirts are each conical and in limited contact with one another immediately adjacent said annular support edge.

4. A one-piece blown plastic container, comprising axially spaced finish and bottom portions joined by an annular side wall, said bottom portion including an arcuate bottom wall joined integrally to said side wall through an outwardly flaring conical skirt terminating in an annular support edge underlying said bottom, said skirt, bottom wall and side wall all having the same thermal history, said side wall having a conical lower portion formed integrally therewith and joined to said skirt at said support edge, said skirt encompassing said lower portion and in contact therewith adjacent said edge, the contracting portions of said bottom being adhered to one another to form an integrally and continuously fused double thickness support base underlying said bottom wall.

5. A one-piece plastic container formed as an article of rotation about an axis and comprising integral finish side-wall and bottom-wall portions, all having the same thermal history said bottom wall being arcuate and circumscribed by a depending skirt the bottom annular edge of which forms the one axial extremity of said container, the side wall also having a depending portion which terminates in an annular edge coextensive with and integral with said skirt edge, said side wall portion encompassing said skirt in surface contact therewith adjacent said edge, the contacting portions of said side wall portion and said skirt being continuously and integrally adhered together to form an annular, multiple thickness bottom support for said container.

* * * * *